United States Patent
Kahn et al.

(10) Patent No.: US 9,497,624 B2
(45) Date of Patent: Nov. 15, 2016

(54) CONNECTIONLESS WIRELESS ACCESS

(71) Applicant: Alcatel-Lucent USA Inc., Murray Hill, NJ (US)

(72) Inventors: Colin L. Kahn, Morris Plains, NJ (US); Harish Viswanathan, Morristown, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 0 days.

(21) Appl. No.: 14/527,869

(22) Filed: Oct. 30, 2014

(65) Prior Publication Data

US 2016/0127894 A1    May 5, 2016

(51) Int. Cl.
| | |
|---|---|
| *H04W 12/06* | (2009.01) |
| *H04W 12/04* | (2009.01) |
| *H04L 29/06* | (2006.01) |
| *H04W 12/08* | (2009.01) |
| *H04W 88/12* | (2009.01) |

(52) U.S. Cl.
CPC .......... *H04W 12/04* (2013.01); *H04L 63/0428* (2013.01); *H04W 12/08* (2013.01)

(58) Field of Classification Search
CPC ............................ H04L 9/0822; H04L 43/026
See application file for complete search history.

(56) References Cited

U.S. PATENT DOCUMENTS

| | | | | |
|---|---|---|---|---|
| 8,558,417 B2 * | 10/2013 | Lee | ........................ | G21C 7/10 310/12.04 |
| 2004/0088536 A1 * | 5/2004 | Lim | .................... | H04L 63/0428 713/151 |
| 2008/0152132 A1 * | 6/2008 | Sung | .................... | H04L 9/0841 380/44 |
| 2011/0264906 A1 * | 10/2011 | Pourzandi | .......... | G06F 21/6218 713/153 |

OTHER PUBLICATIONS

Zubair et al., "A First Look at Cellular Machine-to-Machine Traffic: Large Scale Measurement and Characterization," SIGMETRICS'12, London, UK, Jun. 11-15, 2012.
Viswanathan et al., "Modeling and Analysis of Cellular Wireless Machine-to-Machine Communication Traffic," Bell Labs Technical Memorandum, made available on ReasearchGate on Mar. 10, 2015.

(Continued)

*Primary Examiner* — Venkat Perungavoor
(74) *Attorney, Agent, or Firm* — Tong, Rea, Bentley & Kim, LLC (57) ABSTRACT

A capability for connectionless wireless access is presented. A wireless end device is configured to encrypt context information of the wireless end device, based on a security key associated with attachment of the wireless end device to a wireless communication network, to form encrypted context information, generate a packet including a header and a payload where the header includes the encrypted context information, and propagate the packet toward a wireless access node of the wireless communication network. The wireless access node is configured to receive the packet and propagate the encrypted context information toward a controller of the wireless communication network. The controller is configured to receive the encrypted context information from the wireless access node, decrypt the encrypted context information based on a security key associated with attachment of the wireless end device to the wireless communication network to recover the context information of the wireless end device, and determine, based on the context information, whether the wireless end device is permitted to communicate via the wireless communication network.

18 Claims, 5 Drawing Sheets

(56) References Cited

OTHER PUBLICATIONS

3GPP, "3rd Generation Partnership Project; Technical Specification Group Radio Access Network; LTE Radio Access Network (RAN) enhancements for diverse data applications (Release 11)," 3GPP TR 36.822, v11.0.0, Sep. 2012.

3GPP, "3rd Generation Partnership Project; Technical Specification Group Services and System Aspects; General Packet Radio Service (GPRS) enhancements for Evolved Universal Terrestrial Radio Access Network (E-UTRAN) access (Release 13)," 3GPP TS 23.401, v13.0.0, Sep. 22, 2014.

Vakilian et al., "Universal-Filtered Multi-Carrier Technique for Wireless Systems Beyond LTE," Proceedings of 9th International Workshop on Broadband Wireless Access, IEEE Globecom'13, Atlanta, GA, USA, Dec. 9-13, 2013.

Dhillon et al., "Throughput Optimal Communication Strategy for the Wireless Random Access Channel," IEEE Globecom'13, Atlanta, GA, USA, Dec. 9-13, 2013.

3GPP, "3rd Generation Partnership Project; Technical Specification Group Services and System Aspects; 3GPP System Architecture Evolution (SAE); Security aspects of non-3GPP accesses (Release 12)," 3GPP TS 33.402, v12.4.0, Sep. 2014.

\* cited by examiner

CONNECTIONLESS WIRELESS ACCESS

TECHNICAL FIELD

The disclosure relates generally to wireless communication networks and, more specifically but not exclusively, to supporting communication via wireless access nodes of wireless communication networks.

BACKGROUND

In existing wireless communication systems, a wireless end device typically is required to proceed through many exchanges with elements of a network in order to be able to attach to the network and communicate data via the network. The exchanges between the wireless end device and the network enable the network to authenticate the wireless end device, authorize service for the wireless end device, and setup radio link bearers and core network bearers before the wireless end device communicates data via the network. While this type of exchange enables the network to establish secure communications, it also may be highly inefficient in various situations (e.g., where the wireless end device communicates short bursts of data via the network). Thus, there is a need for an improved mechanism, which reduces the overhead associated with radio link bearer establishment, for authorized communication by a wireless end device via a network.

SUMMARY OF EMBODIMENTS

Various deficiencies in the prior art may be addressed by embodiments for supporting connectionless wireless access by a wireless end device for communication via a wireless communication network.

In at least some embodiments, a wireless end device includes a processor and a memory communicatively connected to the processor. The processor is configured to encrypt context information of the wireless end device, based on a security key associated with attachment of the wireless end device to a wireless communication network, to form encrypted context information. The processor is configured to generate a packet including a header and a payload, where the payload includes data to be communicated from the wireless end device and the header includes the encrypted context information. The processor is configured to propagate the packet toward a wireless access node of the wireless communication network. In at least some embodiments, a corresponding method may be provided. In at least some embodiments, a non-transitory computer-readable storage medium stores instructions which, when executed by a computer, cause the computer to perform a corresponding method.

In at least some embodiments, a wireless access node includes a processor and a memory communicatively connected to the processor. The processor is configured to receive, from a wireless end device, a packet comprising a header and a payload, where the payload includes data to be communicated by the wireless end device via the wireless communication network and the header includes encrypted context information. The processor is configured to propagate the encrypted context information toward a controller of the wireless communication network. In at least some embodiments, a corresponding method may be provided. In at least some embodiments, a non-transitory computer-readable storage medium stores instructions which, when executed by a computer, cause the computer to perform a corresponding method.

In at least some embodiments, a controller includes a processor and a memory communicatively connected to the processor. The processor is configured to receive, from a wireless access node of a wireless communication network, encrypted context information of a wireless end device. The processor is configured to decrypt the encrypted context information, based on a security key associated with attachment of the wireless end device to the wireless communication network, to recover context information of the wireless end device. The processor is configured to determine, based on the context information of the wireless end device, whether the wireless end device is permitted to communicate via the wireless communication network. In at least some embodiments, a corresponding method may be provided. In at least some embodiments, a non-transitory computer-readable storage medium stores instructions which, when executed by a computer, cause the computer to perform a corresponding method.

BRIEF DESCRIPTION OF THE DRAWINGS

The teachings herein can be readily understood by considering the following detailed description in conjunction with the accompanying drawings, in which.

To facilitate understanding, identical reference numerals have been used, where possible, to designate identical elements common to the figures.

DETAILED DESCRIPTION OF EMBODIMENTS

In general, a capability for connectionless wireless access by a wireless end device to a wireless communication network is presented. In at least some embodiments, a wireless end device, a wireless access node of the wireless communication network, and a controller of the wireless communication network may be configured to provide various functions of the capability for connectionless wireless access by the wireless end device to the wireless communication network. The wireless end device may be configured to encrypt context information of the wireless end device, based on a security key associated with attachment of the wireless end device to a wireless communication network, to form encrypted context information, generate a packet including a header and a payload where the header includes the encrypted context information, and propagate the packet toward a wireless access node of the wireless communication network. The wireless access node may be configured to receive the packet and propagate the encrypted context information toward a controller of the wireless communication network. The controller may be configured to receive the encrypted context information from the wireless access node, decrypt the encrypted context information based on a security key associated with attachment of the wireless end device to the wireless communication network to recover the context information of the wireless end device, and determine, based on the context information, whether the wireless end device is permitted to communicate via the wireless communication network. These and various other embodiments and advantages of the capability for connectionless wireless access may be further understood when considered within the context of an exemplary wireless communication system as depicted in FIG. 1.

Figure 1:
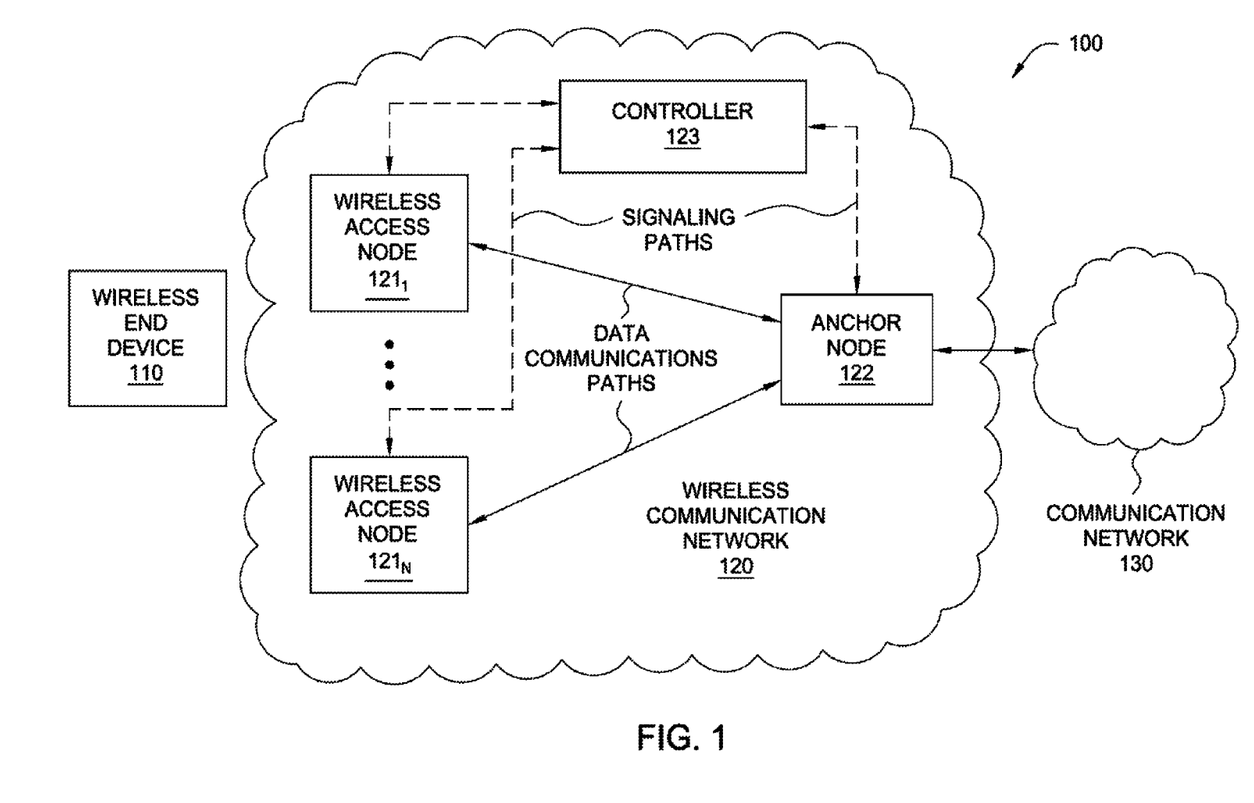
FIG. 1 depicts an exemplary wireless communication system configured to support connectionless wireless access by a wireless end device.

FIG. 1 depicts an exemplary wireless communication system configured to support connectionless wireless access by a wireless end device.

The wireless communication system 100 is a wireless communication system configured to support connectionless wireless access. The wireless communication system 100 may be based on any suitable wireless system technology. For example, embodiments of the capability for connectionless wireless access may be applied to various cellular-based wireless systems. For example, embodiments of the capability for connectionless wireless access may be applied to Third Generation (3G) wireless systems (e.g., Universal Mobile for Telecommunication Systems (UMTS) or other 3G wireless technologies), Fourth Generation (4G) wireless systems (e.g., Long Term Evolution (LTE) or other 4G wireless technologies), Fifth Generation (5G) wireless systems, or the like. For example, embodiments of the capability for connectionless wireless access may be applied to various other types of wireless systems.

The wireless communication system 100 includes a wireless end device 110, a wireless communication network 120, and a communication network 130.

The wireless end device 110 is a wireless device that is configured to wirelessly access wireless communication network 120 and communicate via wireless communication network 120. The wireless end device 110 may be an end user device (e.g., a smartphone, a tablet computer, a laptop computer, or the like), an autonomous device (e.g., an Internet-of-Things device (e.g., a sensor, a monitor, or the like), a device configured for machine-to-machine (M2M) communications, or the like), or the like. The wireless end device 110 is configured to support various functions in support of the capability for connectionless wireless access, as discussed further with respect to FIGS. 2A and 2B.

The wireless communication network 120 is configured to support communications between wireless end device 110 (as well as various other wireless end devices which have been omitted for purposes of clarity) and communication network 130. The wireless communication network 120 includes a set of wireless access nodes $121_1$-$121_N$ (collectively, wireless access nodes 121), an anchor node 122, and a controller 123. As depicted in FIG. 1, wireless access nodes 121 and anchor node 122 are configured to communicate via data communication paths which it will be appreciated, although omitted for purposes of clarity, may include various network elements (e.g., switches, routers, or the like), communication links, or the like, as well as various combinations thereof. As further depicted in FIG. 1, controller 123 is configured to communicate with wireless access nodes 121 and anchor node 122 via signaling paths which it will be appreciated, although omitted for purposes of clarity, may include various network elements (e.g., switches, routers, or the like), communication links, or the like, as well as various combinations thereof.

The wireless access nodes 121 are configured to operate as wireless points of access to the wireless communication network 120 for wireless end device 110 (as well as various other wireless end devices which, as noted above, have been omitted for purposes of clarity). The wireless access nodes 121 are configured to support network attach procedures by which wireless end device 110 (as well as various other wireless end devices which, as noted above, have been omitted for purposes of clarity) attaches to the wireless communication network 120. The wireless access nodes 121 may support communications between wireless end device 110 and controller 123 in order to enable wireless end device 110 to attach to wireless communication network 120 (e.g., relaying signaling between wireless end device 110 and controller 123 to enable wireless end device 110 to attach to wireless communication network 120 (which may be connection-based attachment or connectionless attachment), storage of context information to support communications by wireless end device 110 via wireless communication network 120 after wireless end device 110 attaches to wireless communication network 120, or the like). The wireless access nodes 121 are configured to support wireless communications of wireless end device 110, including wireless uplink transmission from wireless end device 110 and wireless downlink transmissions to wireless end device 110. The wireless access nodes 121 are configured to support backhaul communications between wireless access nodes 121 and communication network 130. The wireless access nodes 121 may be configured to provide various other functions. For example, wireless access nodes 121 may include 3G UMTS NodeBs, LTE Evolved NodeBs (eNodeBs), 5G base transceiver stations (BTSs), small cell radio access points (e.g., femtocells, picocells, microcells, and so forth), or the like. The typical functions supported by the wireless access nodes of a wireless communication network (such as wireless access nodes 121 of wireless communication network 120) will be understood by one skilled in the art. The wireless access nodes 121 are configured to support various functions in support of the capability for connectionless wireless access, as discussed further below with respect to FIGS. 2A and 2B.

The anchor node 122 is configured to operate as a mobility anchor and a network-layer anchor point (e.g., an IP anchor point) for wireless end devices communicating via wireless communication network 120. The anchor node 122 may be configured to operate as gateway between wireless communication network 120 and communication network 130, supporting communication of packets between wireless communication network 120 and communication network 130. For upstream communications from wireless end device 110 toward communication network 130, the anchor node 122 is configured to direct received packets toward the communication network 130. For downstream communications intended for delivery to the wireless end device 110, the anchor node 122 is configured to receive packets from the communication network 130, identify the wireless access node 121 via which the wireless end device 110 is currently attached, and forward the packets toward the wireless access node 121 via which the wireless end device 110 is currently attached for delivery to the wireless end device 110. For example, anchor node 122 may be a 3G UMTS Gateway General Packet Radio Service (GPRS) Support Node (GGSN), an LTE Packet Data Network (PDN) Gateway (PGW), a 5G switch configured to provide an anchor function, or the like. The typical functions supported by the anchor node of a wireless communication network (such as anchor node 122 of wireless communication network 120) will be understood by one skilled in the art. The anchor node 122 may be configured to support various functions in support of the capability for connectionless wireless access, as discussed further below with respect to FIGS. 2A and 2B.

The controller 123 is configured to provide various control functions for wireless communication network 120. The controller 123 is configured to communicate with wireless access nodes 121 and anchor node 122 for purposes of supporting control functions. The controller 123 is configured to support network attach procedures by which wireless end device 110 (as well as various other wireless end devices which, as noted above, have been omitted for purposes of clarity) attaches to the wireless communication network 120, which may include authentication of wireless end device 110, authorization of service for the wireless end device 110, or the like, as well as various combinations thereof. The controller 123 is configured to maintain context information of wireless end device 110 after wireless end device 110 attaches to wireless communication network 120. The controller 123, after wireless end device 110 attaches to wireless communication network 120, provides control information of wireless end device 110 to the wireless access node 121 via which the wireless end device 110 attaches to the wireless communication network 120 (e.g., control information including context information, packet routing information, encryption keys, or the like) and provides control information of wireless end device 110 to the anchor node 122 (e.g., control information including packet routing information) in order to support communications of wireless end device 110 via wireless communication network 120.

The wireless communication network 120 may be considered to include a wireless access network portion (e.g., including wireless access nodes 121) and a wireless core network portion (e.g., including anchor node 122 and controller 123). The wireless communication network 120 may be implemented in various ways. For example, where wireless communication network 120 is a 3G UMTS-based network, wireless communication network 120 may be implemented using a physical wireless access network portion including wireless access nodes 121 and a physical core network portion including anchor node 122 and controller 123. For example, where the wireless communication network 120 is an LTE-based network, wireless communication network 120 may be implemented using a physical wireless access network portion including wireless access nodes 121 and a physical Evolved Packet Core (EPC) network including the anchor node 122 and controller 123. For example, where the wireless communication network 120 is an LTE-based network, wireless communication network 120 may be implemented using a physical wireless access network portion including wireless access nodes 121 and a virtualized EPC network in which the functions of anchor node 122 and controller 123 are virtualized in a cloud environment. The wireless communication network 120 may be implemented in various other ways.

The wireless communication network 120 may be based on various wireless technologies and, thus, the elements of wireless communication network 120 may be implemented in various ways. As indicated above for example, where the wireless communication network 120 is a 3G UMTS-based network, wireless access nodes 121 may be NodeBs, anchor node 122 may be a Gateway General Packet Radio Service (GPRS) Support Node (GGSN), and controller 123 may be a Mobility Management Entity (MME). As indicated above for example, where the wireless communication network 120 is an LTE-based network, wireless access nodes 121 may be eNodeBs, anchor node 122 may be a Packet Data Network (PDN) Gateway (PGW), and controller 123 may be a Mobility Management Entity (MME). The wireless communication network 120 may be considered to be arranged in other configurations. As indicated above, for example, where the wireless communication network 120 is a 5G network, wireless access nodes 121 may be 5G base transceiver station (BTS), anchor node 122 may be a switch configured to provide an anchor function, and controller 123 may be a 5G network controller. The elements of wireless communication network 120 may be implemented in various other ways.

The wireless communication network 120 may be implemented using various communication and control capabilities or technologies. For example, communication and control capabilities of wireless communication network 120 may be implemented using underlying signaling and control capabilities based on the type of wireless technology of wireless communication network (e.g., underlying signaling and control capabilities of a 3G UMTS-based wireless system, underlying signaling and control capabilities of an LTE-based wireless system, underlying signaling and control capabilities of a 5G wireless system, or the like). For example, communication and control capabilities of wireless communication network 120 may be implemented using a Software Defined Networking (SDN) capability in which controller 123 is configured to operate as an SDN controller and other elements of wireless communication network 120 (namely, wireless access nodes 121, anchor node 122, and, optionally, other elements of wireless communication network 120 which have been omitted for purposes of clarity) are configured to operate as SDN network devices. The communication and control capabilities of wireless communication network 120 may be implemented in various other ways.

The communication network 130 may include any communication network via which wireless end device 110 (as well as various other wireless end devices which, as noted above, have been omitted for purposes of clarity) may communicate. For example, communication network 130 may include one or more public data networks (e.g., the Internet), one or more private data networks (e.g., one or more enterprise networks), or the like, as well as various combinations thereof.

It will be appreciated that, although primarily presented as being arranged in a particular configuration, the various elements of wireless communication system 100 may be arranged in various other ways while still providing various functions of the capability for connectionless wireless access (e.g., wireless access nodes 121 may be considered to be part of a radio access network while anchor node 122 and controller 123 may be considered to be part of a wireless packet core network, the functions of controller 123 may be distributed across multiple elements, or the like, as well as various combinations thereof).

Figure 2A:
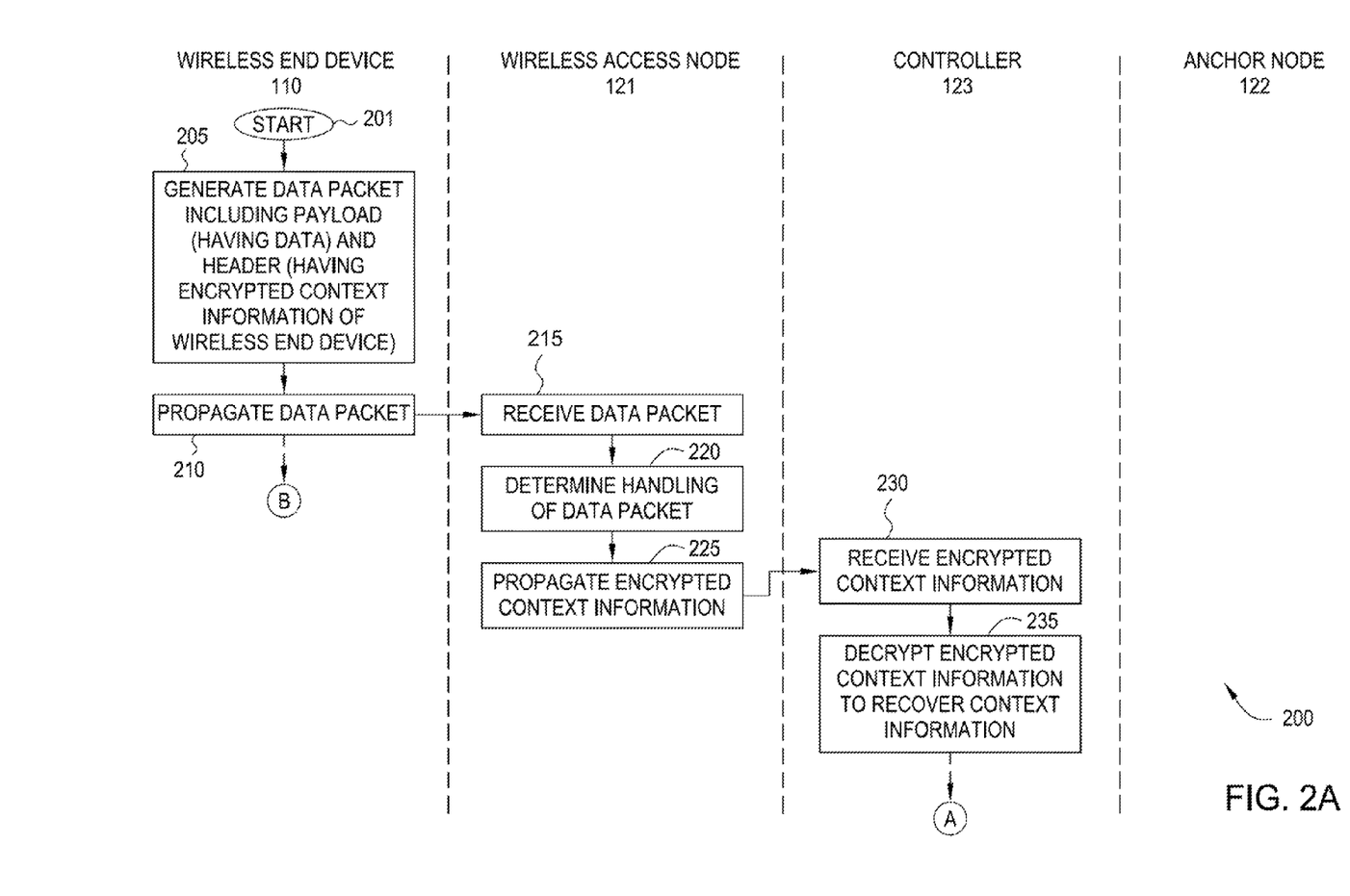
FIGS. 2A and 2B depict an exemplary embodiment of a method by which the wireless end device of FIG. 1 attains connectionless wireless access within the context of the wireless communication system of FIG. 1.
Figure 2B:
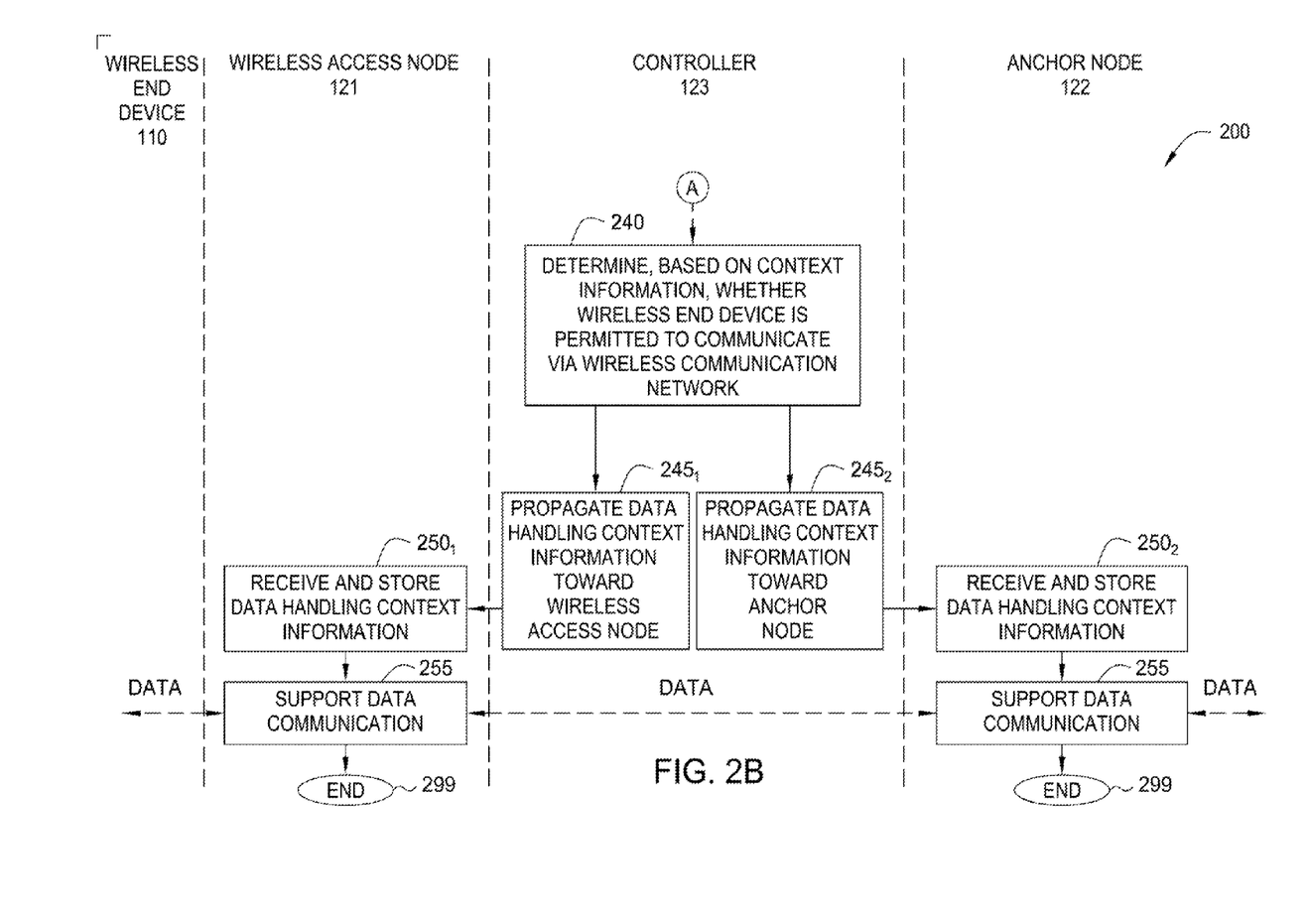

FIGS. 2A and 2B depict an exemplary embodiment of a method by which the wireless end device of FIG. 1 attains connectionless wireless access within the context of the wireless communication system of FIG. 1. As depicted in FIGS. 2A and 2B, wireless end device 110 is attempting to attain connectionless wireless access to wireless communication network 120, which is supported by certain elements of wireless communication network 120 (illustratively, a wireless access node 121, anchor node 122, and controller 123). It is noted that method 200 assumes that (1) the wireless end device 110 has previously attached to the wireless communication network 120 via a wireless access node 121 such that both the wireless end device 110 and the controller 123 of the wireless communication network 120 have access to context information of the wireless end device 110 based on the previous attachment of the wireless end device 110 to the wireless communication network 120 and (2) the wireless end device 110 wants to communicate data via the wireless communication network 120 in a connectionless manner without having to reattach to the wireless communication network 120.

At step 201, method 200 begins.

At step 205, wireless end device 110 generates a data packet. The data packet includes data to be transmitted by the wireless end device 110 to an intended destination(s) via wireless communication network 120. The data packet includes a payload and a header, which are discussed further below.

The payload of the data packet includes the data to be transmitted by the wireless end device 110 to the intended destination(s). The data in the payload of the data packet may be encrypted. The data in the payload of the data packet may be encrypted based on a security key. The data in the payload of the data packet may be encrypted based on a security key associated with attachment of wireless end device 110 to the wireless communication network 120. The security key associated with attachment of the wireless end device 110 to the wireless communication network 120 may be determined (e.g., received, derived, or the like) based on an interaction between the wireless end device 110 and controller 123 of the wireless communication network 120 during a previous attachment of wireless end device 110 to wireless communication network 120. The security key associated with attachment of the wireless end device 110 to the wireless communication network 120 may be a security key associated with an authentication procedure (e.g., an Extensible Authentication Protocol (EAP) procedure or other suitable authentication procedure) performed by the wireless end device 110 and controller 123 during a previous attachment of wireless end device 110 to wireless communication network 120. For example, the security key may be a security key provided to the wireless end device 110 by the controller 123 of the wireless communication network 120 when wireless end device 110 previously attached to the wireless communication network 120, a security key derived by wireless end device 110 based on a security key provided to wireless end device 110 by the controller 123 of the wireless communication network 120 when wireless end device 110 previously attached to the wireless communication network 120 (where the controller 123 also can derive the same security key derived by the wireless end device 110 based on the security key provided to wireless end device 110 by controller 123 of wireless communication network 120), or the like. The data to be transmitted by wireless end device 110 may include any data which may be transmitted by wireless end device 110, which may depend on various factors (e.g., the device type of the wireless end device 110, the intended destination(s) of the data, or the like). For example, where wireless end device 110 is a sensor, the data to be transmitted may be a sensor reading and the intended destination may be an IoT server configured to store the sensor reading. For example, where the wireless end device 110 is an IoT device in a retail setting, the data to be transmitted may be a request for a server to provide content (e.g., an image of an advertisement, an advertising video, or the like) to be presented within the retail setting via a presentation interface associated with the wireless end device 110. For example, where wireless end device 110 is a smartphone, the data to be transmitted may be a message including content (e.g., a text message, a photo, a video, or the like) intended for delivery to one or more recipients. It will be appreciated that the foregoing examples are merely a few examples of the various types of data which may be transmitted wirelessly by wireless end device 110.

The header of the data packet includes routing information for use in routing the packet (e.g., source address, destination address, or the like) and includes encrypted context information.

The context information that is encrypted to form the encrypted context information includes context information configured to enable connectionless access by the wireless end device 110 to communication network 120. The context information that is encrypted to form the encrypted context information may include authentication context information of the wireless end device 110 that is associated with a previous authentication of the wireless end device 110 to communicate via the wireless communication network 120 (e.g., a key set identifier (KSI), an integrity signature, an authentication code, or the like, as well as various combinations thereof), authorization context information enabling authorization of service for the wireless end device 110 to communicate via the wireless communication network 120 (e.g., device identity information (e.g., an International mobile subscriber identity (IMSI) associated with wireless end device 110, a temporarily assigned device identifier associated with wireless end device 110, or the like), an authorization code, or the like, as well as various combinations thereof), communication context information for use by the wireless end device 110 to communicate via the wireless communication network 120 (e.g., one or more security keys for encryption of data or the like), application context information, or the like, as well as various combinations thereof. The context information that is encrypted to form the encrypted context information may include other types of information (e.g., physical cell identification information associated with a wireless access node 121 via which the wireless end device is attached to the wireless communication network 120, a security key agreement, one or more security keys, an indication as to whether or not the wireless end device 110 supports mobility, an indication as to whether or not the wireless end device 110 will enter an idle mode or go to sleep, or the like, as well as various combinations thereof). The context information that is encrypted to form the encrypted context information may include any other context information configured to enable connectionless access by the wireless end device 110 to the communication network 120.

The encrypted context information is encrypted based on a security key of the wireless end device that also is available at the controller 123 of the wireless communication network 120. The security key of the wireless end device 110 may be a security key provided to the wireless end device 110 by the controller 123 of the wireless communication network 120 when wireless end device 110 previously attached to the wireless communication network 120, a security key derived by wireless end device 110 based on a security key provided to wireless end device 110 by the controller 123 of the wireless communication network 120 when wireless end device 110 previously attached to the wireless communication network 120 (where the controller 123 also can derive the same security key derived by the wireless end device 110 based on the security key provided to wireless end device 110 by controller 123 of wireless communication network 120), or the like. The encrypted context information also may be integrity protected in a similar manner.

The encrypted context information may be arranged within the header of the data packet in any suitable manner.

Figure 3:
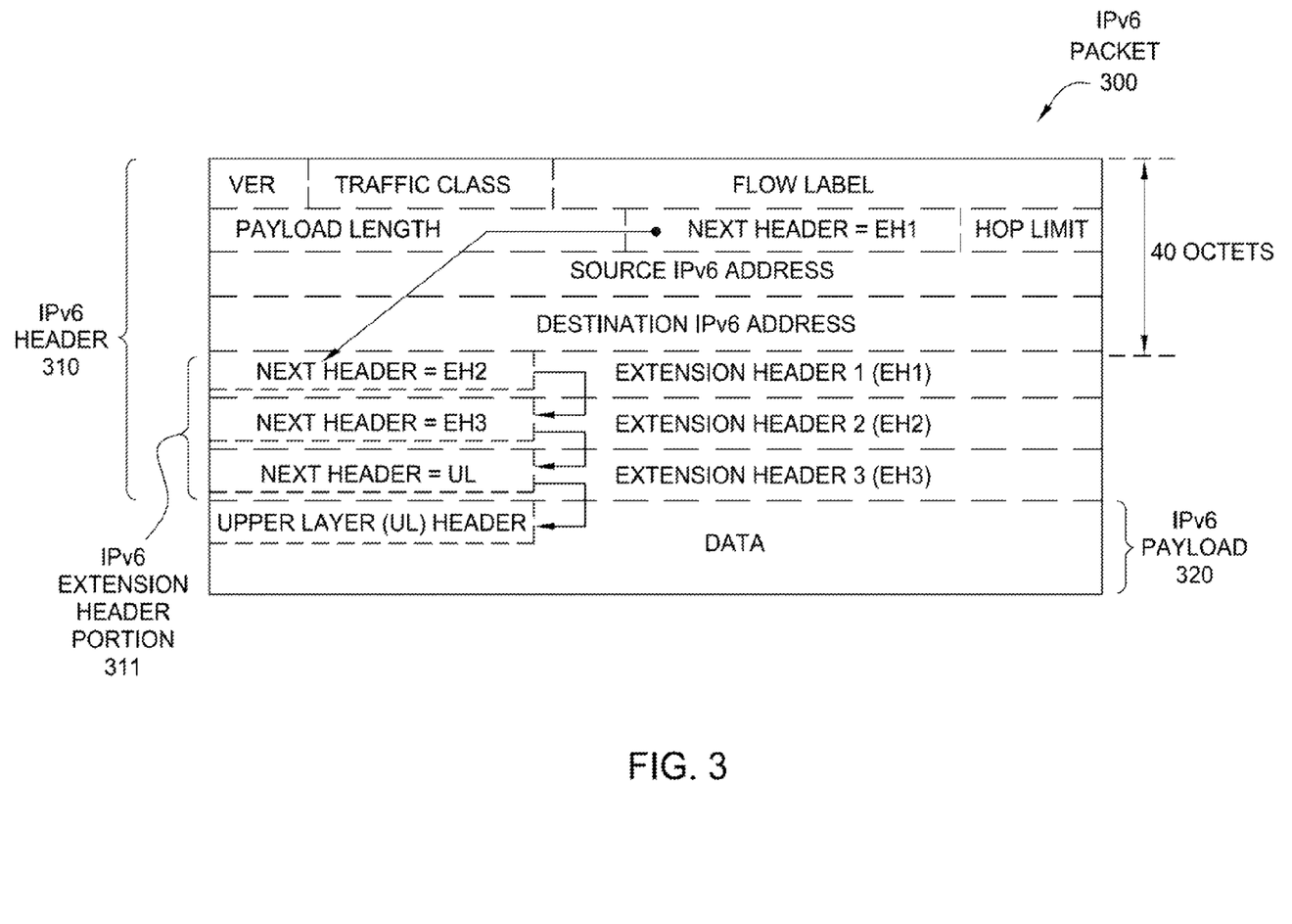
FIG. 3 depicts an exemplary encoding of encrypted context information of the wireless end device of FIG. 1 within a set of IPv6 Extension Headers.

The encrypted context information may be included within one or more header fields of the data packet. The encrypted context information may be included within an extension header portion of the data packet (e.g., within a set of extension headers including one or more extension headers). The encrypted context information may be included within an IPv6 Extension Header portion of a data packet where the data packet is an IPv6 packet including an IPv6 header and an IPv6 payload (e.g., within a set of IPv6 Extension Headers including one or more IPv6 Extension Headers). It will be appreciated that the IPv6 header of an IPv6 packet is defined in the Internet Engineering Task Force (IETF) RFC 2460. As indicated in RFC 2460, the IPv6 header supports an 8-bit IPv6 "Next Header" field which specifies the protocol of the next header and which may be set in a manner for indicating the presence of an IPv6 Extension Header within the IPv6 header of the IPv6 packet. In RFC 2460, the following types of IPv6 Extension Headers are currently supported: a Hop-by-Hop Options extension header, a Routing extension header, a Fragment extension header, a Destination Options extension header, an Authentication extension header, and an Encapsulating Security Payload (ESP) extension header. As indicated in RFC 2460, each of the IPv6 Extension Header types is examined only at the destination node with the exception of the Hop-by-Hop Options extension header type (which may be examined at each hop along the path of the IPv6 packet). In at least some embodiments, the encrypted context information may be included within the IPv6 Extension Header portion of an IPv6 packet using the Hop-by-Hop Options extension header type (e.g., as indicated in RFC 2460, the Hop-by-Hop Options extension header may include a type-length-value (TLV) encoded "option" and the encrypted context information may be included within the "value" portion of the TLV). In at least some embodiments, the encrypted context information may be included within the IPv6 Extension Header portion of an IPv6 packet using a newly defined IPv6 Extension Header that is not currently defined in RFC 2460 (e.g., a First Hop Only extension header type that is only examined by the first hop of the path of the IPv6 packet and is then stripped from the packet, or using any other suitable type of extension header which may be included as an IPv6 Extension Header within an IPv6 header of an IPv6 packet). FIG. 3 depicts an exemplary encoding of encrypted context information within an IPv6 Extension Header portion of an IPv6 packet. As depicted in FIG. 3, the IPv6 packet 300 includes an IPv6 header 310 and an IPv6 payload 320. The header 310 includes a Version Field (first half of octet 1), a Traffic Class field (second half of octet 1 and first half of octet 2), a Flow Label field (second half of octet 2 through octet 4), a Payload Length field (octets 5-6), a Next Header field (octet 7), a Hop Limit field (octet 8), a Source Address Field (octets 9-24), and a Destination Address Field (octets 25-40). In the example of FIG. 3, the encrypted context information is included within an IPv6 Extension Header portion 311 of IPv6 header 310 of IPv6 packet 300. The IPv6 Extension Header portion 311 of IPv6 header 310 includes a set of three IPv6 Extension Headers (EHs), including a first IPv6 Extension Header (denoted as EH1), a second IPv6 Extension Header (denoted as EH2), and a third IPv6 Extension Header (denoted as EH3). The Next Header field in octet 7 of the IPv6 header 310 includes a pointer to the first IPv6 Extension Header (EH1). The first IPv6 Extension Header (EH1) includes a first portion of the encrypted context information and a pointer to the second IPv6 Extension Header (EH2). The second IPv6 Extension Header (EH2) includes a second portion of the encrypted context information and a pointer to the third IPv6 Extension Header (EH3). The third IPv6 Extension Header (EH3) includes a third portion of the encrypted context information and a pointer to an Upper Layer (UL) header of the IPv6 payload 320 of IPv6 packet 300. It will be appreciated that, although depicted and described with respect to embodiments in which the encrypted context information is encoded within three IPv6 Extension Headers, fewer or more IPv6 Extension Headers may be used to encode the encrypted context information within an IPv6 packet. It will be appreciated that, although primarily depicted and described with respect to embodiments in which the encrypted context information is encoded within three IPv6 Extension Headers, other types of Extension Headers or other types of header fields may be used to encode the encrypted context information within an IPv6 packet or within another type of packet. The encrypted context information may be included within the header of the data packet in other ways.

At step 210, wireless end device 110 propagates the data packet toward wireless access node 121. At step 215, wireless access node 121 receives the data packet from the wireless end device 110. The wireless access node 121 that receives the data packet may be any wireless access node 121 that does not currently have context information that is required in order to support communication by wireless end device 110 via wireless communication network 120. For example, the wireless access node 121 may be a different wireless access node 121 than the wireless access node 121 via which the wireless end device 110 initially attached to wireless communication network 120, the same wireless access node 121 via which the wireless end device 110 initially attached to wireless communication network (e.g., where that wireless access node 121 no longer has data handling context information of the wireless end device 110 (e.g., the context information has timed-out and has been deleted by the wireless access node 121), but the wireless end device 110 is still considered by controller 123 as being attached to wireless communication network 120), or the like.

At step 220, wireless access node 121 determines handling of the data packet received from wireless end device 110. The determination of handling of the data packet received from wireless end device 110 may include a determination as to whether wireless access node 121 is configured to support communication by wireless end device 110 via the wireless access node 121 and wireless communication network 120. The determination as to whether wireless access node 121 is configured to support communication by the wireless end device 110 via the wireless access node 121 and wireless communication network 120 may include a determination as to whether data handling context information of wireless end device 110 (namely, data handling context information required by wireless access node 121 for handling of the data packet received from wireless end device 110, as discussed further below with respect to steps $245_1$ and $250_1$) is available to the wireless access node 121. Accordingly, the determination of handling of the data packet received from wireless end device 110 may include a determination as to whether wireless access node 121 may decrypt the data packet and forward the data packet for delivery to the intended destination of the data packet (e.g., when data handling context information of wireless end device 110 is available at the wireless access node 121) or whether wireless access node 121 requires additional information in order to forward the data packet for delivery to the intended destination of the data packet (e.g., when data handling context information of wireless end device 110 is not available at the wireless access node 121). The data handling context information of the wireless end device 110, as discussed further below, may include any context information which may be needed by wireless access node 121 in order to support communication by the wireless end device 110 via the wireless access node 121 and wireless communication network 120, such as security context information (e.g., a data security key which may be used by the wireless access node 121 to decrypt the data in the payload of the data packet, which may be a data security key provided to the wireless access node 121 by the controller 123 of the wireless communication network 120 when wireless end device 110 previously attached to the wireless communication network 120, a security key derived by wireless access node 121 based on a security key provided to wireless access node 121 by the controller 123 of the wireless communication network 120 when wireless end device 110 previously attached to the wireless communication network 120, or the like), communication context information (e.g., a data routing rule for use by wireless access node 121 in forwarding data packets received from the wireless end device 110), or the like. It is noted that the determination as to whether wireless access node 121 is configured to support communication by wireless end device 110 via wireless access node 121 and wireless communication network 120 also may be said to be a determination as to whether the encrypted context information of the data packet is to be propagated to controller 123. In the exemplary embodiment of FIGS. 2A and 2B, it is assumed that wireless access node 121 determines that data handling context information of wireless end device 110 is not available at the wireless access node 121 and, thus, that the encrypted context information of the data packet is to be propagated to the controller 123. It is noted that, if wireless access node 121 determines that data handling context information of wireless end device 110 is available at the wireless access node 121 and, thus, that the encrypted context information of the data packet does not need to be propagated to the controller 123, wireless access node 121 may simply process the data packet for forwarding toward the intended destination and propagate the data packet via wireless communication network 120 for delivery to the intended destination.

The wireless access node 121 may determine that data handling context information of wireless end device 110 is not available at the wireless access node 121 and, thus, that the encrypted context information of the data packet is to be propagated to the controller 123, in various ways.

In at least some embodiments, for example, the wireless access node 121 may determine that the encrypted context information of the data packet is to be propagated to the controller 123 by determining an identity of the wireless end device 110 and determining, based on the identity of the wireless end device 110, whether wireless access node 121 has data handling context information of the wireless end device 110. The wireless access node 121 may determine the identity of the wireless end device 110 from the routing information included in the header of the data packet (the non-encrypted portion of the header of the data packet). The wireless access node 121 may determine whether wireless access node 121 has data handling context information of wireless end device 110 based on a lookup, using the identity of the wireless end device 110 (e.g., device identifier, source address, or the like), to determine whether the wireless access node 121 currently has data handling context information of the wireless end device 110. This embodiment may be used where the wireless end device 110 is aware that the wireless access node 110 does not have data handling context information of the wireless end device 110 (e.g., wireless end device 110 is aware of the identity of wireless access node 121 and knows that it did not previously attach to the wireless communication network 120 via this wireless access node 121) or is unsure as to whether the wireless access node 121 has data handling context information of the wireless end device 110 (e.g., wireless end device 110 is aware of the identity of wireless access node 121 and knows that it previously attached to the wireless communication network 120 via this wireless access node 121 but there is a possibility that the wireless access node 121 no longer has data handling context information of the wireless end device 110, wireless end device 110 is not aware of the identity of wireless access node 121 and as a result does not know whether it previously attached to the wireless communication network 120 via this wireless access node 121, or the like). This embodiment also may be used in other scenarios.

In at least some embodiments, for example, wireless access node 121 may determine that the encrypted context information of the data packet is to be propagated to the controller 123 based on detection of the presence of the encrypted context information within the header of the data packet.

The wireless access node 121 may determine that data handling context information of wireless end device 110 is not available at the wireless access node 121 and, thus, that the encrypted context information of the data packet is to be propagated to the controller 123, in various other ways.

At step 225, wireless access node 121, based on a determination that data handling context information of wireless end device 110 is not available at wireless access node 121, propagates the encrypted context information of the data packet toward the controller 123. The wireless access node 121 may propagate the encrypted context information of the data packet toward the controller 123 in various ways. In at least some embodiments, wireless access node 121 may propagate the encrypted context information of the data packet toward the controller 123 by forwarding the data packet toward the controller 123. In at least some embodiments, wireless access node 121 may propagate the encrypted context information of the data packet toward the controller 123 by extracting the header of the data packet from the data packet and forwarding the header of the data packet toward the controller 123. In at least some embodiments, wireless access node 121 may propagate the encrypted context information of the data packet toward the controller 123 by extracting the encrypted context information from the header of the data packet and forwarding the encrypted context information toward the controller 123. The wireless access node 121 may propagate the encrypted context information of the data packet toward the controller 123 in various other ways.

At step 230, the controller 123 receives the encrypted context information of the data packet from the wireless access node 121. As discussed above, the controller 123 may receive the encrypted context information of the data packet from the wireless access node 121 by receiving the data packet (e.g., the wireless access node 121 forwards the data packet to the controller 123 and the controller 123 extracts the encrypted context information from the header of the data packet for decryption and processing by controller 123), receiving the header of the data packet (e.g., the wireless access node 121 forwards the header of data packet to the controller 123 and the controller 123 extracts the encrypted context information from the header of the data packet for decryption and processing by controller 123), receiving the encrypted context information of the data packet (e.g., the wireless access node 121 forwards only the encrypted context information of the data packet to the controller 123 and the controller 123 decrypts and processes the encrypted context information), or the like.

At step 235, the controller 123 decrypts the encrypted context information to recover the context information encrypted by the wireless end device 110. The controller 123 decrypts the encrypted context information to recover the context information based on a security key used by the wireless end device 110 to encrypt the context information. The security key used by the controller 123 to decrypt the encrypted context information to recover the context information, as previously discussed, may be a security key provided to the wireless end device 110 by the controller 123 when wireless end device 110 previously attached to the wireless communication network 120, a security key derived by wireless end device 110 based on a security key provided to wireless end device 110 by the controller 123 when wireless end device 110 previously attached to the wireless communication network 120 (where the controller 123 also can derive the same security key derived by the wireless end device 110 based on the security key provided to wireless end device 110 by controller 123 of wireless communication network 120), or the like. The controller 123 may identify the security key used by the wireless end device 110 to encrypt the context information and, thus, to be used by the controller 123 to decrypt the encrypted context information to recover the context information encrypted, based on an identity of the wireless end device 110.

At step 240, controller 123 determines, based on the context information from the wireless end device 110, whether the wireless end device 110 is permitted to communicate via wireless communication network 120. The processing of context information from the wireless end device 110 to determine whether wireless end device 110 is permitted to communicate via wireless communication network 120 may include evaluation of authentication context information of the context information to determine whether wireless end device 110 was previously authenticated to communicate via wireless communication network 120, evaluation of authorization context information of the context information to determine whether wireless end device 110 was previously authorized for service to communicate via wireless communication network 120, or the like, as well as various combinations thereof. In the exemplary embodiment of FIGS. 2A and 2B, it is assumed that controller 123 successfully validates that the wireless end device 110 is permitted to communicate via wireless communication network 120 (which is indicative that the wireless end device 110 previously successfully attached to the wireless communication network 120). It will be appreciated that, if controller 123 fails to successfully validate that the wireless end device 110 is permitted to communicate via wireless communication network 120, the controller 123 could provide an indication of the failure to wireless access node 121 (e.g., which may then provide an indication of the failure to wireless end device 110, initiate a full attach procedure in which wireless end device 110 initially attaches to wireless communication network 120, or the like), controller 123 may initiate a full attach procedure in which wireless end device 110 initially attaches to wireless communication network 120, or the like, as well as various combinations thereof.

At step 245, controller 123 distributes data handling context information based on successful verification by the controller 123 that wireless end device 110 is permitted to communicate via wireless communication network 120. The controller 123 may distribute data handling context information to wireless access node 121 (as indicated by step 245$_1$, discussed further below), to anchor node 122 (as indicated by step 245$_2$, discussed further below), or the like, as well as various combinations thereof.

At step 245$_1$, controller 123 propagates data handling context information to the wireless access node 121 based on successful verification by the controller 123 that wireless end device 110 is permitted to communicate via wireless communication network 120. The data handling context information propagated to wireless access node 121 may include information which may be used by wireless access node 121 to facilitate communication by wireless end device 110 via wireless communication network 120. The data handling context information propagated to wireless access node 121 may include information which typically would be provided to a wireless access node when the wireless end device 110 initially attaches to wireless communication network 120. The data handling context information propagated to wireless access node 121 may include security context information (e.g., a data security key which may be used by the wireless access node 121 to decrypt the data in the payload of the data packet, which may be a data security key provided to the wireless access node 121 by the controller 123 of the wireless communication network 120 when wireless end device 110 previously attached to the wireless communication network 120, a security key derived by wireless access node 121 based on a security key provided to wireless access node 121 by the controller 123 of the wireless communication network 120 when wireless end device 110 previously attached to the wireless communication network 120, or the like). The data handling context information propagated to wireless access node 121 may include communication context information (e.g., a data routing rule for use by wireless access node 121 in forwarding data packets received from the wireless end device 110). The data handling context information propagated from controller 123 to wireless access node 121 may include any other suitable information which may be used by wireless access node 121 to facilitate communication by wireless end device 110 via wireless communication network 120. The controller 123 may propagate data handling context information to wireless access node 121 in any suitable manner (e.g., by encoding the context information within the data packet when the wireless access node 121 provides the context information to the controller 123 by forwarding the data packet received from the wireless end device 110, as one or more messages independent from the data packet, or the like, as well as various combinations thereof).

At step 245$_2$, controller 123 propagates data handling context information to the anchor node 122 based on successful verification by the controller 123 that wireless end device 110 is permitted to communicate via wireless communication network 120. The data handling context information propagated to anchor node 122 may include information which may be used by anchor node 122 to facilitate communication of data packets to wireless end device 110 via wireless communication network 120. The data handling context information propagated to anchor node 122 may include information which typically would be provided to an anchor node when the wireless end device 110 initially attaches to wireless communication network 120. The data handling context information propagated to anchor node 122 may include a data routing rule for use by anchor node 122 in routing toward wireless end device 110 any packets received from communication network 130 and intended for wireless end device 110. The data handling context information propagated from controller 123 to anchor node 122 may include any other suitable information which may be used by to anchor node 122 to facilitate communication of data packets to wireless end device 110 via wireless communication network 120. The controller 123 may propagate data handling context information to anchor node 122 in any suitable manner (e.g., by encoding the context information within the data packet when the wireless access node 121 provides the context information to the controller 123 by forwarding the data packet received from the wireless end device 110 and forwarding the data packet to the anchor node 122, as one or more messages independent from the data packet, or the like, as well as various combinations thereof). It is noted that, although omitted from method 200 for purposes of clarity, anchor node 122 may respond to the controller 123 with an acknowledgment message indicative that anchor node 122 has received the data handling context information from controller 123.

At step 250, wireless communication network 120 is configured to support connectionless communication by wireless end device 110 via wireless communication network 120. The configuration of wireless communication network 120 to support connectionless communication by wireless end device 110 via wireless communication network 120 may include configuration of wireless access node 121 based on data handling context information received from controller 123 (as indicated by step 250$_1$, discussed further below, which corresponds to step 245$_1$ discussed above), configuration of anchor node 122 based on data handling context information received from controller 123 (as indicated by step 250$_2$, discussed further below, which corresponds to step 245$_2$ discussed above), or the like, as well as various combinations thereof.

At step 250$_1$, wireless access node 121 receives the data handling context information of wireless end device 110 and stores the data handling context information of wireless end device 110. For example, the wireless access node 121 may store security context information of wireless end device 110 (e.g., one or more security keys, as discussed with respect to step 245$_1$) for use by the wireless access node 121 in decrypting the data in the payloads of data packets received from wireless end device 110 (e.g., including the initial data packet received from the wireless end device 110 in step 210 and any subsequent data packet received from the wireless end device 110). For example, the wireless access node 121 may update a data routing table of wireless access node 121 to include data handling context information of wireless end device 110 (e.g., a data routing rule for use by wireless access node 121 in forwarding data packets received from the wireless end device 110, including the initial data packet received from wireless end device 110 in step 210 and any subsequent data packet received from wireless end device 110).

At step 250$_2$, anchor node 122 receives the data handling context information of wireless end device 110 and stores the data handling context information of wireless end device 110. For example, the anchor node 122 may update a data routing table of anchor node 122 to include data handling context information of wireless end device 110 (e.g., a data routing rule for use by anchor node 122 in forwarding data packets received from communication network 130 and intended for delivery to the wireless end device 110).

At step 255, wireless communication network 120 supports communication of wireless end device 110 based on connectionless wireless access to wireless communication network 120. This is illustrated as steps at wireless end device 110, wireless access node 121, and anchor node 122 as communication may include (1) upstream communication from wireless end device 110 to communication network 130 via wireless access node 121 and anchor node 122 and (2) downstream communication from communication network 130 to wireless end device 110 via anchor node 122 and wireless access node 121. For example, as discussed above, upon receiving and storing data handling context information of wireless end device 110, wireless access node 121 may decrypt and forward the initial data packet received in step 210 as well as any subsequent data packet received from wireless end device 110. Similarly, for example, as discussed above, upon receiving and storing data handling context information of wireless end device 110, anchor node 122 may support forwarding of data packets toward wireless end device 110.

At step 299, method 200 ends.

It will be appreciated that method 200 of FIG. 2, although primarily depicted and described as ending (for purposes of clarity), may continue to be executed for continuing to support communication of wireless end device 110 based on connectionless wireless access to wireless communication network 120, may be re-executed using a different wireless access node 121 for enabling wireless end device 110 to communicate based on connectionless wireless access to wireless communication network 120 (via the different wireless access node 121), or the like.

It will be appreciated that within the context of method 200 of FIG. 2, communication between the elements of wireless communication network 120 may be performed in any suitable manner. As discussed with respect to FIG. 1, for example, where wireless communication network 120 is an LTE-based network including an E-TRAN portion and an EPC, communication between the controller 123 and wireless access node 121 and between controller 123 and anchor node 122 may be performed using existing signaling interfaces as defined for LTE. As discussed with respect to FIG. 1, for example, where wireless communication network 120 is an SDN-based network (e.g., using OpenFlow or using any other suitable SDN-based communication protocol), communication between the controller 123 and wireless access node 121 and between controller 123 and anchor node 122 may be performed using any suitable SDN-based communication protocol. It will be appreciated that, within the context of method 200 of FIG. 2, communication between the elements of wireless communication network 120 may be performed in any other suitable manner.

It will be appreciated that, although primarily depicted and described herein with respect to embodiments in which the wireless access node and the anchor node are separate nodes and data packets associated with the wireless end device are communicated (e.g., tunneled) therebetween (e.g., propagation of data packets between wireless access node 121 and anchor node 122, as depicted and described with respect to FIG. 1 and FIG. 2), in at least some embodiments the wireless access node is the anchor node for the wireless end device (in which case the message from the controller 123 to the anchor node 122, as depicted and described with respect to steps 245$_2$ and 250$_2$, may be redundant and, thus, may not be required).

Various embodiments of the capability for connectionless wireless access may provide various advantages. In at least some embodiments, the capability for connectionless wireless access may enable better support for handling short bursts of traffic from wireless devices, especially where the amount of user data to be sent is small compared to the signaling overhead (e.g., air-interface signaling overhead required in to setup radio bearers, manage mobility, and so forth) that would otherwise be required to send the data (since such signaling overhead, given the relatively small amount of user data to be sent, would result in inefficient use of network resources, wasting of wireless device battery power, and so forth). This is particularly useful for Machine-Type-Communication (MTC), since (1) MTC devices (e.g., mobile sensors and so forth) generally need to be both inexpensive and have long battery life compared to existing mobile devices), (2) MTC devices usually engage in transactions where only short bursts of data are exchanged and (3) the volume of MTC traffic is continuing to grow and become more important in various contexts and environments (e.g., within the context of 5G or any other contexts or environments which may support MTC traffic). In at least some embodiments, the capability for connectionless wireless access may support connectionless, contention-based access (and bearer plane data bursts) for mobile devices without dedicated control plane signaling to setup radio bearers (e.g., without dedicated control plane signaling such as is typically required for mobile device access via 3G and 4G wireless communication systems or other types of systems in which mobile device access is connection-based). In at least some embodiments, the capability for connectionless wireless access may support connectionless, contention-based access for a mobile device, without dedicated control plane signaling to setup radio bearers, where the mobile device has previously attached to a wireless access node (e.g., where the mobile device was previously authenticated and authorized for access, and security keys were previously established for bearer packet integrity) and then needs to reattach (e.g., when the mobile device goes idle and the wireless access node deletes its context information, when the mobile device moves to a new location, or the like). Various embodiments of the capability for connectionless wireless access may provide various other advantages.

Figure 4:
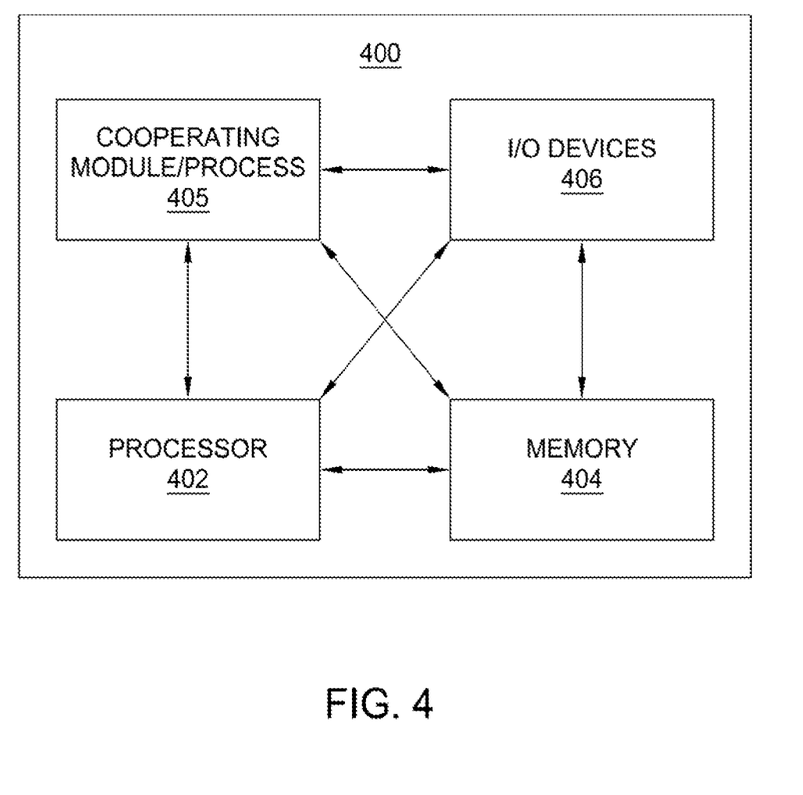
FIG. 4 depicts a high-level block diagram of a computer suitable for use in performing functions described herein.

FIG. 4 depicts a high-level block diagram of a computer suitable for use in performing functions described herein.

The computer 400 includes a processor 402 (e.g., a central processing unit (CPU) and/or other suitable processor(s)) and a memory 404 (e.g., random access memory (RAM), read only memory (ROM), and the like).

The computer 400 also may include a cooperating module/process 405. The cooperating process 405 can be loaded into memory 404 and executed by the processor 402 to implement functions as discussed herein and, thus, cooperating process 405 (including associated data structures) can be stored on a computer readable storage medium, e.g., RAM memory, magnetic or optical drive or diskette, and the like.

The computer 400 also may include one or more input/output devices 406 (e.g., a user input device (such as a keyboard, a keypad, a mouse, and the like), a user output device (such as a display, a speaker, and the like), an input port, an output port, a receiver, a transmitter, one or more storage devices (e.g., a tape drive, a floppy drive, a hard disk drive, a compact disk drive, and the like), or the like, as well as various combinations thereof).

It will be appreciated that computer 400 depicted in FIG. 4 provides a general architecture and functionality suitable for implementing functional elements described herein and/or portions of functional elements described herein. For example, the computer 400 provides a general architecture and functionality suitable for implementing one or more of wireless end device 110, a portion of wireless end device 110, a wireless access node 121, a portion of a wireless access node 121, anchor node 122, a portion of anchor node 122, controller 123, a portion of controller 123, an element of wireless communication network 120, an element of communication network 130, or the like.

It will be appreciated that the functions depicted and described herein may be implemented in software (e.g., via implementation of software on one or more processors, for executing on a general purpose computer (e.g., via execution by one or more processors) so as to implement a special purpose computer, and the like) and/or may be implemented in hardware (e.g., using a general purpose computer, one or more application specific integrated circuits (ASIC), and/or any other hardware equivalents).

It will be appreciated that at least some of the steps discussed herein as software methods may be implemented within hardware, for example, as circuitry that cooperates with the processor to perform various method steps. Portions of the functions/elements described herein may be implemented as a computer program product wherein computer instructions, when processed by a computer, adapt the operation of the computer such that the methods and/or techniques described herein are invoked or otherwise provided. Instructions for invoking the inventive methods may be stored in fixed or removable media (e.g., non-transitory computer-readable media), transmitted via a data stream in a broadcast or other signal bearing medium, and/or stored within a memory within a computing device operating according to the instructions.

It will be appreciated that the term "or" as used herein refers to a non-exclusive "or," unless otherwise indicated (e.g., use of "or else" or "or in the alternative").

It will be appreciated that, although various embodiments which incorporate the teachings presented herein have been shown and described in detail herein, those skilled in the art can readily devise many other varied embodiments that still incorporate these teachings.

What is claimed is:

1. A wireless access node of a wireless communication network, the wireless access node comprising:
 a processor and a memory communicatively connected to the processor, the processor configured to:
  receive, from a wireless end device, a packet comprising a header and a payload, the payload comprising data to be communicated by the wireless end device via the wireless communication network, the header comprising encrypted context information;
  propagate the encrypted context information toward a controller of the wireless communication network; and
  receive, from the controller based on a determination that the wireless end device is permitted to communicate via the wireless communication network, data handling context information, wherein the data handling context information comprises at least one of:
   security context information configured for enabling the wireless access node to decrypted a payload portion of a packet received from the wireless end device; or
   communication context information configured for use by the wireless access node to determine forwarding of a packet received from the wireless end device, wherein the communication context information comprises a data forwarding rule for use by the wireless access node in determining forwarding of a packet received from the wireless end device.

2. The wireless access node of claim 1, wherein the processor is configured to propagate the encrypted context information toward the controller of the wireless communication network based on a determination that a security key necessary to decrypt the encrypted context information is not available to the wireless access node.

3. The wireless access node of claim 1, wherein the processor is configured to propagate the encrypted context information toward the controller of the wireless communication network based on a detection that the packet includes the encrypted context information.

4. The wireless access node of claim 1, wherein, to propagate the encrypted context information toward the controller of the wireless communication network, the processor is configured to:
propagate the packet toward the controller of the wireless communication network.

5. The wireless access node of claim 1, wherein, to propagate the encrypted context information toward the controller of the wireless communication network, the processor is configured to:
extract the encrypted context information from the header of the packet; and
propagate the extracted encrypted context information toward the controller of the wireless communication network.

6. A controller associated with a wireless communication network, the controller comprising:
a processor and a memory communicatively connected to the processor, the processor configured to:
receive, from a wireless access node of the wireless communication network, encrypted context information of a wireless end device;
decrypt the encrypted context information, based on a security key associated with attachment of the wireless end device to the wireless communication network, to recover context information of the wireless end device;
determine, based on the context information of the wireless end device, whether the wireless end device is permitted to communicate via the wireless communication network; and
propagate data handling context information toward the wireless access node based on a determination that the wireless end device is permitted to communicate via the wireless communication network, wherein the data handling context information comprises at least one of:
security context information configured for enabling the wireless access node to decrypted a payload portion of a packet received from the wireless end device; or
communication context information configured for use by the wireless access node to determine forwarding of a packet received from the wireless end device, wherein the communication context information comprises a data forwarding rule for use by the wireless access node in determining forwarding of a packet received from the wireless end device.

7. The controller of claim 6, wherein, to receive the encrypted context information, the processor is configured to:
receive at least a portion of a header of a packet sent by the wireless end device to the wireless access node, wherein the at least a portion of the header of the packet includes the encrypted context information.

8. The controller of claim 6, wherein, to receive the encrypted context information, the processor is configured to:
receive a packet sent by the wireless end device to the wireless access node, wherein the packet comprises a header and a payload, wherein the header includes the encrypted context information.

9. The controller of claim 6, wherein the processor is configured to:
propagate communication context information toward a network node based on a determination that the wireless end device is permitted to communicate via the wireless communication network, wherein the communication context information is configured for use by the network node to determine downstream forwarding of a packet intended for delivery to the wireless end device.

10. A method for use by a wireless access node of a wireless communication network, the method comprising:
receiving, from a wireless end device, a packet comprising a header and a payload, the payload comprising data to be communicated by the wireless end device via the wireless communication network, the header comprising encrypted context information;
propagating the encrypted context information toward a controller of the wireless communication network; and
receiving, from the controller based on a determination that the wireless end device is permitted to communicate via the wireless communication network, data handling context information, wherein the data handling context information comprises at least one of:
security context information configured for enabling the wireless access node to decrypted a payload portion of a packet received from the wireless end device; or
communication context information configured for use by the wireless access node to determine forwarding of a packet received from the wireless end device, wherein the communication context information comprises a data forwarding rule for use by the wireless access node in determining forwarding of a packet received from the wireless end device.

11. The method of claim 10, wherein the encrypted context information is propagated toward the controller of the wireless communication network based on a determination that a security key necessary to decrypt the encrypted context information is not available to the wireless access node.

12. The method of claim 10, wherein the encrypted context information is propagated toward the controller of the wireless communication network based on a detection that the packet includes the encrypted context information.

13. The method of claim 10, wherein propagating the encrypted context information toward the controller of the wireless communication network comprises:
propagating the packet toward the controller of the wireless communication network.

14. The method of claim 10, wherein propagating the encrypted context information toward the controller of the wireless communication network comprises:
extracting the encrypted context information from the header of the packet; and
propagating the extracted encrypted context information toward the controller of the wireless communication network.

15. A method for use by a controller associated with a wireless communication network, the method comprising:

receiving, from a wireless access node of the wireless communication network, encrypted context information of a wireless end device;

decrypting the encrypted context information, based on a security key associated with attachment of the wireless end device to the wireless communication network, to recover context information of the wireless end device;

determining, based on the context information of the wireless end device, whether the wireless end device is permitted to communicate via the wireless communication network; and propagating data handling context information toward the wireless access node based on a determination that the wireless end device is permitted to communicate via the wireless communication network, wherein the data handling context information comprises at least one of:

security context information configured for enabling the wireless access node to decrypted a payload portion of a packet received from the wireless end device; or communication context information configured for use by the wireless access node to determine forwarding of a packet received from the wireless end device, wherein the communication context information comprises a data forwarding rule for use by the wireless access node in determining forwarding of a packet received from the wireless end device.

16. The method of claim 15, wherein receiving the encrypted context information comprises:
receiving at least a portion of a header of a packet sent by the wireless end device to the wireless access node, wherein the at least a portion of the header of the packet includes the encrypted context information.

17. The method of claim 15, wherein receiving the encrypted context information comprises:
receiving a packet sent by the wireless end device to the wireless access node, wherein the packet comprises a header and a payload, wherein the header includes the encrypted context information.

18. The method of claim 15, further comprising:
propagating communication context information toward a network node based on a determination that the wireless end device is permitted to communicate via the wireless communication network, wherein the communication context information is configured for use by the network node to determine downstream forwarding of a packet intended for delivery to the wireless end device.

* * * * *